United States Patent [19]

Petrini et al.

[11] 3,944,364

[45] Mar. 16, 1976

[54] BORDERLESS PRINTING EASEL

[76] Inventors: Richard R. Petrini, 237 Wall St.; Dorin F. Van Lue, 1080 Essex St., both of Livermore, Calif. 94550

[22] Filed: July 24, 1974

[21] Appl. No.: 491,299

[52] U.S. Cl. ................................................. 355/74
[51] Int. Cl.² ........................................ G03B 27/58
[58] Field of Search ....... 355/74, 72, 125, 126, 128, 355/129, 130, 131, 132

[56] References Cited
UNITED STATES PATENTS

| | | | |
|---|---|---|---|
| 1,900,651 | 3/1933 | Koenig et al. | 355/74 |
| 3,512,887 | 5/1970 | Caraballo | 355/72 |
| 3,728,021 | 4/1973 | Retzyl et al. | 355/74 |
| 3,829,211 | 8/1974 | Mitchell | 355/74 |

FOREIGN PATENTS OR APPLICATIONS

| | | | |
|---|---|---|---|
| 575,977 | 4/1957 | Canada | 355/74 |

*Primary Examiner*—L. T. Hix
*Assistant Examiner*—E. M. O'Connor
*Attorney, Agent, or Firm*—Bruce & McCoy

[57] ABSTRACT

A borderless printing easel comprised of a paper support base having a retaining border formed thereon, and a set of flat sectioned mask plates removably positionable on the base portion, the individual sections of said mask plate being hinged at their center by a pliable strip of adhesive material whereby the mask sections can be successively folded back onto the top of opposing mask sections to reproduce adjacent or nearly adjacent borderless prints on a single sheet of print paper.

6 Claims, 9 Drawing Figures

U.S. Patent   March 16, 1976   3,944,364
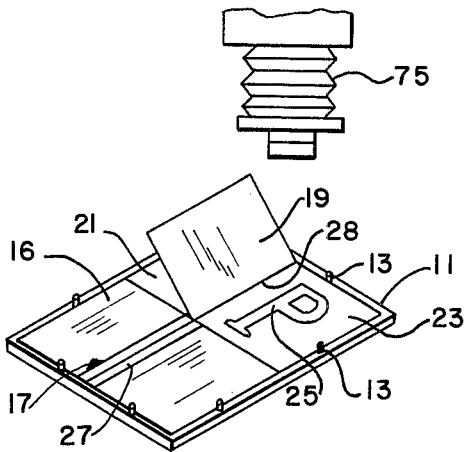
FIG.—1
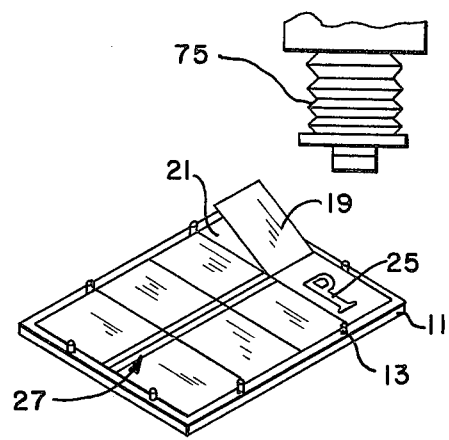
FIG.—2
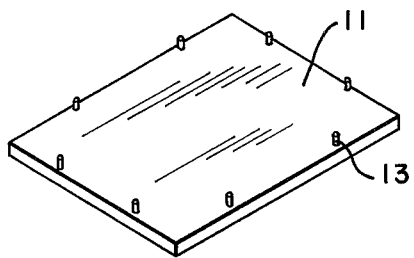
FIG.—3
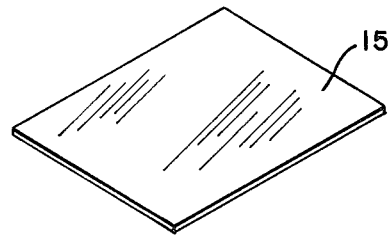
FIG.—4
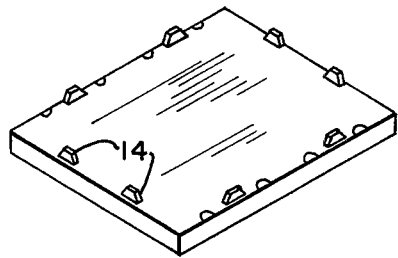
FIG.—5
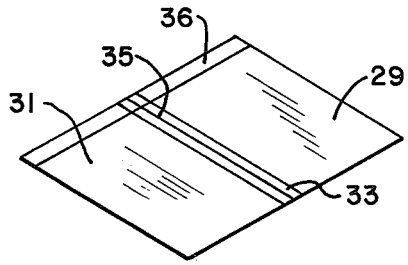
FIG.—6
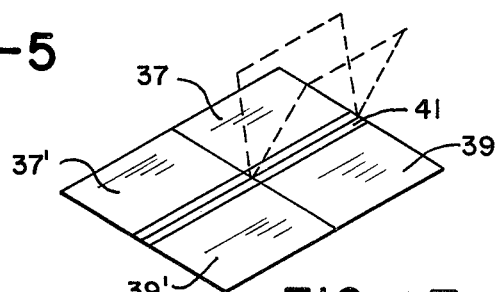
FIG.—7
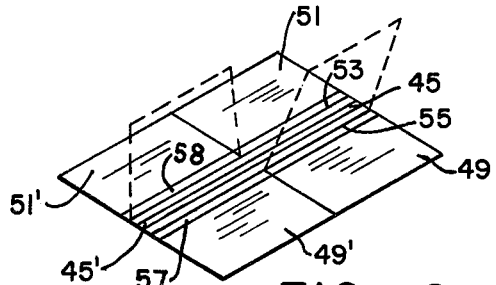
FIG.—8
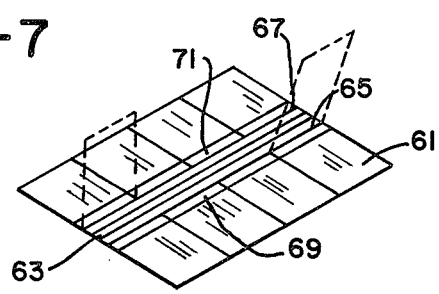
FIG.—9

BORDERLESS PRINTING EASEL

BACKGROUND OF THE INVENTION

1. Field of the Invention

The present invention relates to photographic developing devices, and more particularly to a borderless printing easel for minimizing paper loss during the production of one or more borderless prints from a single sheet of paper.

2. Description of the Prior Art

Existing printing easels suffer from the disadvantage that they are cumbersome to operate and are usually expensive to fabricate. More importantly, existing easels waste a substantial amount of paper because of their structure by producing prints on a single sheet of paper which are spaced apart from one another thereby reducing the number of prints which ideally could be fitted on a sheet of paper by spacing those prints closer together.

One such printing easel is described in Retzyl, U.S. Pat. No. 3,728,021. The Retzyl patent discloses a printing easel having various sized openings formed in a frame which is supported over a slidable paper holder; covers are adapted to separately open and close over the openings and a blocking means is provided for positioning the paper relative to the covered openings. The Retzyl device produces prints which are spaced apart resulting in the waste of a portion of the printing paper. The present invention reduces this paper waste and also eliminates the need for a blocking mechanism for positioning the printing paper underneath exposure openings. As an example of the savings achieved by the present invention, the present invention will produce eight 2½ × 3½ prints on a single sheet of 8 × 10 inch paper whereas the Retzyl device will produce only six 2½ × 3½ prints on the same 8 × 10 inch piece of paper.

Another printing easel is described in Krassopoulas, U.S. Pat. No. 3,230,823. Krassopoulos includes a rectangular frame having openings formed therein, and hinged doors adapted to separately open and close over the openings. This is similar to the Retzyl apparatus except that there is no means for adjusting the paper beneath the frame. Like Retzyl, the exposures produced are spaced apart on the print paper due to the necessity of maintaining a spaced relation with respect to the exposure openings. The result is wasted paper, a disadvantage which the present invention is designed to overcome.

The printing easel of the present invention is novel and unique in that it uses almost the entire sheet of an 8 × 10 inch sheet of printing paper, and does not require mechanisms for adjusting various apertures relative to the printing paper. Using this invention, a maximum number of prints of a given preselection of sizes can be rapidly and efficiently produced on a single sheet of print paper. The apparatus has the further advanatage of being adaptable to inexpensive mass production techniques, such as stamping of the mask plates, thereby reducing the equipment cost to the photographer.

SUMMARY OF THE INVENTION

The present invention is a borderless printing easel for minimizing paper loss during the production of one or a multiple of borderless prints. It is comprised of a paper support base having border alignment members projecting therefrom which are suitably arranged to hold a standard sized sheet of printing paper. A set of flat sectioned mask plates are provided and these plates are removably positionable within the alignment members projecting from the base such that the borders of the mask plates align with the borders of the printing paper. The individual sections of the mask plates are hinged generally in the central portion of the plates such that they can be folded back flat against the top of the adjacent opposing mask sections. One or more mask plates can be selectively used to sequentially produce a number of prints of preselected sizes to utilize the largest percentage of the entire sheet of printing paper for the prints desired.

OBJECTS OF THE INVENTION

It is therefore an important object of the present invention to provide a borderless printing easel which minimizes printing paper loss during the production of one or a multiple of borderless prints from a single sheet of paper.

It is another object of the present invention to provide a borderless printing easel which has a set of mask plates having foldable mask sections wherein the mask plates can easily be arranged to cover the entire sheet of print paper such that contiguous or nearly contiguous prints can be produced by successively uncovering or exposing portions of the print paper disposed beneath the mask sections.

It is a further object of the present invention to provide a borderless printing easel wherein hinged mask sections can be folded back onto opposed mask sections to provide a clean straight unobstructed border at the hinged edge.

It is still another object of the present invention to provide a borderless printing easel which does not require the adjustment of the print paper relative to apertures supported over same.

And it is still a further object of the present invention to provide a borderless printing easel which can be inexpensively manufactured using known mass production techniques.

Other features and objects of the invention will become apparent from the following detailed description of the preferred embodiment when taken in conjunction with the accompanying drawings.

DESCRIPTION OF DRAWINGS

FIG. 1 is a perspective view of the present invention disposed below a photo enlarger showing two mask plates disposed within the retaining border wherein each plate has two opposed foldable mask sections.

FIG. 2 is a perspective view of the present invention disposed beneath a photo enlarger showing a mask plate having 8 foldable sections.

FIG. 3 is a perspective view of the paper support base with projecting border alignment pins.

FIG. 4 is a perspective view of the transparent cover movably disposable within the projecting alignment pins of FIG. 3.

FIG. 5 is a perspective view of an alternative embodiment of the invention wherein the border alignment members are formed of molded projections.

FIG. 6 is a perspective view of an 8 × 10 inch mask plate having two 5 × 8 inch foldable mask sections for producing standard 5 × 7 inch prints.

FIG. 7 is a perspective view of two 5 × 8 inch mask plates each having two 4 × 5 inch adjacent foldable mask sections for producing standard 4 × 5 inch prints.

FIG. 8 is a perspective view of two 5 × 8 mask plates each having two opposing 3½ × 5 inch foldable mask sections for producing standard 3½ × 5 inch prints.

FIG. 9 is a perspective view of an 8 × 10 inch mask plate having eight 2½ × 3½ inch foldable mask sections for producing standard 2½ × 3½ prints.

DESCRIPTION OF THE PREFERRED EMBODIMENT

The present invention, in its perferred embodiment, is a novel borderless printing easel designed to minimize paper loss and to produce the largest number of standard sized prints on a single sheet of printing paper. For this purpose, a plurality of different sized masks are provided which, according to the present invention, can be individually or in combination closely arranged over a sheet of print paper whereby sections of the masks can be successively folded back to expose contiguous or nearly contiguous portions of the print paper. The invention which is used with a standard photo enlarger is compact and has few parts and has a simplicity of construction and operation which will become more clearly evident from the description set forth hereinafter.

Referring now to the drawings, paper support base 11 is provided having border alignment members, such as metal pins 13, projecting therefrom suitably arranged to position and hold a standard sized sheet of printing paper within its perimeter on the base. In one embodiment, metal pins 13 are evenly spaced to form an 8 × 10 inch rectangular retaining border and, as can be seen in FIGS. 1–3, the base dimensions as viewed from the top are only somewhat larger. It should be pointed out that means other than projecting pins 13 can be used as a retaining border such as, for example, molded projections 14 shown in FIG. 5, so long as the retaining border is formed to encompass an average sized sheet of print paper. Preferrably an 8 × 10 inch border is provided. Additionally, finger troughs (not shown) for lifting the print paper can also be molded into the base at convenient locations therearound.

To hold the print paper flat against the base portion 11, and to prevent damage to the print paper by the print masks (more fully described below), a flat transparent cover, such as glass cover 15 shown in FIG. 4, is preferrably provided and is removably positionable over the printing paper held within the retaining border and has an outer perimeter conforming to the perimeter of the retaining border so as to be captured therein. The flat transparent cover is preferrably manufactured of glass to prevent scratching, but may also be manufactured of other transparent materials such as plastic. Such a cover is not necessary to the operation of the invention, but is described here as an accessory to the preferred embodiment.

Sectioned mask plates 16, such as are shown in FIGS. 6–9, are removably positionable on base 11 within the retaining border pins 13, or in the case of the embodiment in FIG. 5, within molded projections 14. Each mask plate is adapted to be held within the retaining border to either cover the whole print such as is the case with the mask plates shown in FIGS. 6 and 9, or an integral portion of the print such as is the case with the masks shown in FIGS. 7 and 8.

The mask plates 16 are hinged generally in the central portion 17 thereof whereby one of the hinged section, such as 19, can be folded back flat against the top of an opposing mask section, such as 21. In this manner the uncovered portion 23 of the print paper can be exposed for making a print of a subject, such as 25, and one or more mask sections of mask plate 16 can be selectively folded back to sequentially produce a number of prints of that preselected size. The resulting prints are arranged in a closely contiguous fashion thereby using the largest possible percentage of printing paper for the prints desired.

Each of the mask plates provided have foldable sections of a different size, preferably chosen to correspond to standard sized prints, such that a variety of different sized prints can be produced. The mask plates can be interchanged for producing different sized prints on a single sheet of print paper.

The hinges, such as 27, on each of the plurality of mask plates are preferably formed of a plyable strip of adhesive material adapted to adhere to the adjacent surfaces of the abutting mask sections such that, when the mask plate is placed flat over the transparent cover covering the print paper, one of these sections can be folded back in a flush relationship onto the top of an opposing section thereby producing a straight, unobstructed border, such as 28, at the hinged edge. A strip of impregnated adhesive cloth is suitable for this purpose. When one section is folded back onto the other, both sections lie perfectly flat in a flush relationship and no light is permitted to strike the print paper except on that exposed portion uncovered by the folded back mask section.

To achieve the most economical results in terms of total paper usage, and to provide for the printing of standard sized photographs, a set of mask plates are provided such as are shown in FIGS. 6–9. The first plate of the set, shown in FIG. 6, is an 8 × 10 inch plate having two 5 × 8 inch foldable mask sections for producing standard 5 × 7 inch prints. Adhesive strip 33 is adapted to adhere to adjacent portions of mask sections 29, 31 thereby creating a straight unobstructed hinged edge 35. It is noted that by using this mask to produce a standard 5 × 7 inch print, a 1 inch surplus strip 36 will appear along one margin of the exposed area. Of course, the entire area may be exposed to produce a 5 × 8 inch print, however, such a print size does not conform to a standard size. It is possible to eliminate the hinge on the print mask shown in FIG. 6, and to provide for separate 5 × 8 inch mask plates which can be individually positioned onto base 11 without significantly reducing the ease by which the present invention can be operated.

Referring to FIG. 7, two 5 × 8 inch mask plates are also provided each having two 4 × 5 inch adjacent foldable mask sections 37, 37', 39, 39' joined in the center by adhesive strip 41, 41'. The two mask plates of FIG. 7 can be closely arranged within retaining border pins 13, or molded projections 14, whereby one of the sections, or more than one of these sections in succession, can be folded back for producing standard 4 × 5 inch prints. For example, four 4 × 5 inch prints can be produced by successively folding back each of the mask sections 37, 37', 39, 39', and each of these prints will be perfectly contiguous on the print paper such that there would be no waste of paper at all.

Referring to FIG. 8, two additional 5 × 8 inch mask plates are provided each having a 1 inch centrally located surplus strip 45, 45' to which are hinged two opposing 3½ × 5 inch foldable masks 49, 49', 51, 51'. Hinges 53 and 55 are formed by strips of adhesive material 57 and 58. Like the mask shown in FIG. 7, the masks shown in FIG. 8 are adapted to be juxtiposed within the perimeter of the retaining border pins 13, or molded projections 14, whereby the entire piece of printing paper is covered. By individually folding back any one of the mask sections 49, 49', 51, 51', a 3½ × 5 inch print can be produced. Therefore, if, for example, four 3½ × 5 inch prints are to be produced on the 8 × 10 inch sheet of printing paper, each individual mask section 49, 49', 51, 51', of the mask plate shown in FIG. 8 would be successively folded back while an image is projected onto the uncovered areas. In such an arrangement, an unprinted strip of 1 inch would appear along the center of these prints.

It should be noted that both the mask plates shown in FIG. 8, and likewise both of the mask plates shown in FIG. 7, need not be used together, but rather one of the masks shown in FIG. 7 may be used in conjunction with one of the masks shown in FIG. 8 if, for example, it is desired to produce two 4 × 5 inch prints and two 3½ × 5 inch prints. The only unused paper resulting from this arrangement would be a 1 inch surplus strip between the 3½ × 5 inch prints.

FIG. 9 shows a mask plate for producing standard 2½ × 3½ inch prints. This mask plate measures 8 × 10 inch and closely fits within the retaining border so as to cover the entire sheet of print paper. Mask sections 61 are formed on this plate and foldably hinged to a one inch centrally located surplus strip 63, hinges 65 and 67 being formed by two strips of flexible adhesive material 69 and 71 adapted to adhere to the adjacent abutting surfaces of the mask sections and the centrally located surplus strip. By folding the mask section back onto an opposing mask section an unobstructed hinged edge is formed whereby only the portion of the print paper exposed by folding back the mask section is printed.

To operate the printing easel of the present invention, a sheet of 8 × 10 inch print paper is placed within the retaining border pins 13 on the base 11, or alternatively within molded projections 14. Transparent cover 15 is then placed over the sheet of print paper whereby the transparent cover holds the print paper flat against the base within the retaining border. The print sizes are then selected and the printing mask plates chosen accordingly. Depending on the print sizes one or more than one mask plate may be utilized. If, for example, four 2½ × 3½ inch prints and two 3½ × 5 inch prints are desired, the printing mask shown in FIG. 9 can be used to produce the four 2½ × 3½ inch prints and then the mask shown in FIG. 8 can be used to produce the two 3½ × 5 inch prints. Using the easel of the present invention this number of prints will fit on a single sheet of 8 × 10 inch print paper.

Photo enlarger 75 which holds the negative to be enlarged must be focused and for this purpose a photo block (not shown) equal in height to the base 11 can be provided. Once the enlarger is initially focused on the back of this block, no further focusing is required.

To individually expose each picture, photo enlarger 75 is suitably positioned over one of the mask sections by projecting the image of the negative on the back surface of that section. After setting the exposure time the mask section is folded back flush onto the opposing mask section thereby uncovering the portion of the print paper to be exposed and providing a clean sharp edge at the hinged edge. The uncovered portion of the print paper is then exposed for an appropriate length of time and the hinged mask section folded back to a covering position. This process is now repeated for an adjacent mask section thereby producing a print immediately or closely adjacent, depending on the size of the print, to the print previousely produced. Using the various print masks described above, the following combination of photographs can be produced on a single 8 × 10 inch sheet of printing paper:

|     | 2½" × 3½" | 3½" × 5" | 4" × 5" | 5" × 7" | 8" × 10" |
|-----|-----------|----------|---------|---------|----------|
| 1.  | 8         |          |         |         |          |
| 2.  |           | 4        |         |         |          |
| 3.  |           |          | 4       |         |          |
| 4.  |           |          |         | 2       |          |
| 5.  |           |          |         |         | 1        |
| 6.  | 4         | 2        |         |         |          |
| 7.  | 4         |          | 2       |         |          |
| 8.  | 6         | 1        |         |         |          |
| 9.  | 6         |          | 1       |         |          |
| 10. |           | 2        | 2       |         |          |
| 11. |           | 2        |         | 1       |          |
| 12. |           | 1        | 1       | 1       |          |
| 13. |           |          | 2       | 1       |          |
| 14. | 4         |          |         | 1       |          |

The present invention is a novel printing easel which is easy to operate in a dark room and which it has been found can save the photographer from 24 to 30% on paper. The invention also provides printing masks which have inexpensive and durable hinges which provide a straight unobstructed hinged edge for producing borderless prints when a mask section is folded back. Further, the printing easel of the present invention has a minimum number of parts, is compact, and is easily and inexpensively manufactured.

Although the above specification with the accompanying drawings have described the invention in considerable detail, it is not intended that the invention be limited to such detail except as is necessitated by the appendent claims.

We claim:

1. A borderless printing easel for minimizing printing paper loss during the production of one or a multiple of borderless prints comprising
    a paper support base having border alignment members projecting therefrom which are suitably arranged to position and hold a standard sized sheet of printing paper on said base, and
    a set of interchangeable flat sectioned mask plates removably positionable on said base in juxtaposed relationship within said alignment members such that the borders of said set of mask plates align with the borders of said printing paper, said mask plates having hinged portions generally in the center of said plates for forming individual sections of each of said plates, said each individual sections being foldable back flat against the top of opposing mask sections about said hinged portion whereby one or more mask plates can be selectively used to sequentially produce a number of prints of preselected sizes to use the largest percentage of the entire sheet of printing paper for the prints desired.

2. The borderless printing easel of claim 1 wherein said hinged portions on said set of mask plates are formed of a plyable strip of adhesive material adapted to adhere to adjacent surfaces of abutting masking sections whereby one section of each hinged mask plate can be folded back in a flush relationship onto the top of opposing sections to produce a straight unobstructed border at the hinged edge.

3. The borderless printing easel of claim 2 wherein said border alignment members are evenly spaced to form an 8 × 10 rectangular retaining border.

4. The borderless printing easel of claim 3 wherein said set of mask plates includes
- one 8 × 10 inch plate having two 5 × 8 inch foldable mask sections for producing standard 5 × 7 inch prints,
- two 5 × 8 inch plates each having two 4 × 5 inch adjacent foldable mask sections for producing standard 4 × 5 inch prints,
- two 5 × 8 inch plates each having a 1 inch centrally located surplus strip to which are hinged two opposing 3½ × 5 inch foldable mask sections for producing standard 3½ × 5 inch prints, and
- one 8 × 10 inch plate having a 1 centrally located surplus strip to which are hinged eight 2½ × 3½ inch foldable mask sections for producing standard 2½ × 3½ prints.

5. The borderless printing easel of claim 1 wherein a flat transparent cover is removeably disposed over said printing paper and aligned therewith within said alignment members under said masks to hold said paper flat against said base.

6. A borderless printing easel for minimizing paper waste during the production of one or a multiple of borderless prints comprising
- a flat base block having a plurality of border alignment members projecting therefrom which are suitably arranged to form an 8 × 10 inch rectangular retaining border,
- a flat transparent cover removably positionable over an 8 × 10 inch sheet of printing paper held within said alignment members,
- a set of interchangeable flat sectioned mask plates removably positionable over said transparent cover within said retaining border, said mask plates having hinged portions generally in the center of said plates for forming individual maks sections of each plate, said hinge portions being formed by a pliable strip of adhesive material adapted to adhere to adjacent surfaces of abutting masking sections whereby one section of said hinged masks can be folded back flat up against the top of adjacent sections to produce a straight unobstructed border at the hinged edge, said set of mask plates comprising
- one 8 × 10 inch plate having two 5 × 8 inch foldable mask sections for producing standard 5 × 7 inch prints,
- two 5 × 8 inch plates each having two 4 × 5 inch adjacent foldable mask sections for producing standard 4 × 5 inch prints,
- two 5 × 8 inch plates each having a 1 inch centrally located surplus strip to which are hinged two 3½ × 5 inch foldable mask sections for producing standard 3½ × 5 inch prints, and
- one 8 × 10 inch plate having a 1 inch centrally located surplus strip to which are hinged eight 2½ × 3½ inch foldable mask sections for producing standard 2½ × 3½ inch prints.

* * * * *